(12) United States Patent
Sugie et al.

(10) Patent No.: US 6,498,773 B1
(45) Date of Patent: Dec. 24, 2002

(54) OPTICAL DISK DRIVE AND WRITE SPEED CONTROL METHOD

(75) Inventors: Noboru Sugie, Chofu (JP); Akihiro Niimura, Sunnyvale, CA (US)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/525,650

(22) Filed: Mar. 15, 2000

(51) Int. Cl.$^7$ .................................................. G11B 7/00
(52) U.S. Cl. ................................................... 369/47.28
(58) Field of Search ........................... 369/47.27, 47.36, 369/47.4, 47.41, 47.46, 47.48, 47.28

(56) References Cited

U.S. PATENT DOCUMENTS 5,956,307 A * 9/1999 Koudo et al. ................. 369/50
6,178,146 B1 * 1/2001 Hogan ........................... 369/47
6,201,784 B1 * 3/2001 Maeda ..................... 369/275.3
6,256,282 B1 * 7/2001 Yamagami et al. ......... 369/111
6,285,647 B1 * 9/2001 Van Woudenberg et al.

* cited by examiner

Primary Examiner—Nabil Hindi
(74) Attorney, Agent, or Firm—Ladas & Parry

(57) ABSTRACT

An optical disk device has a motor that rotates an optical disk, motor control means for making constant a rotational speed of the motor, and write control means for changing a write frequency of information written to the optical disk such that writing of the information onto the optical disk is made at a substantially constant recording density, irrespective of a track on which the information is recorded.

2 Claims, 13 Drawing Sheets

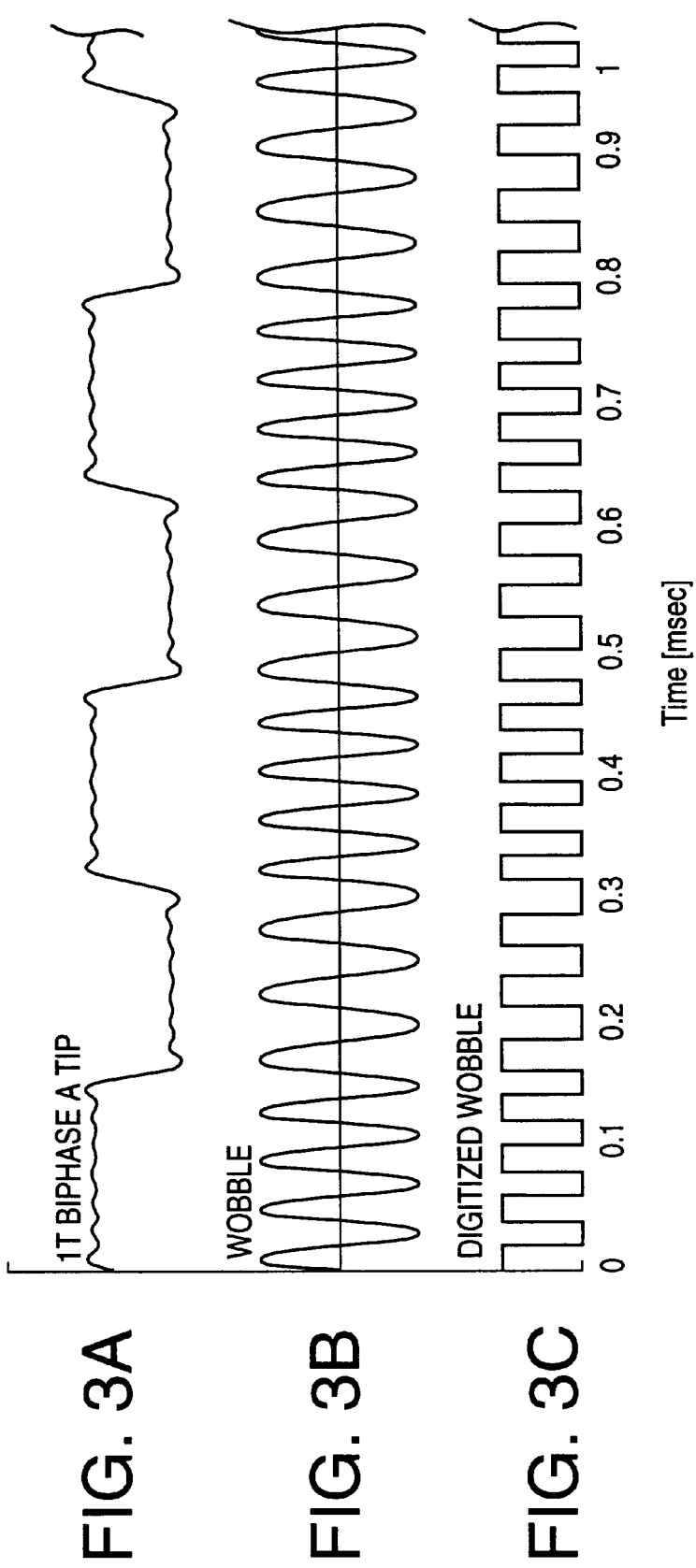

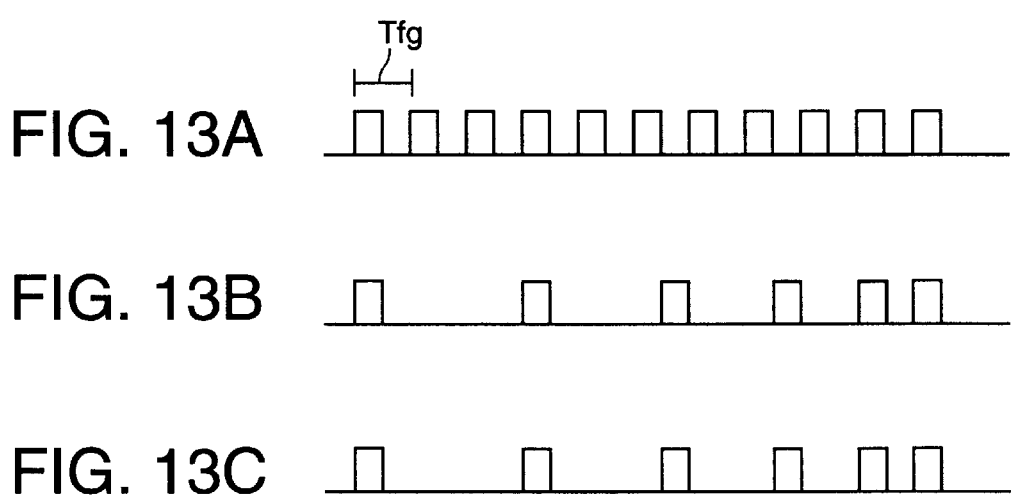

OPTICAL DISK DRIVE AND WRITE SPEED CONTROL METHOD

BACKGROUND OF THE INVENTION

1. Field of the Invention

The present inventions relates generally to a disk drive and write speed control method, and more particularly, to an optical disk drive and write speed control method for writing information to a disk at a constant angular velocity.

2. Description of the Related Art

Generally, drive devices for CD-R (Compact Disk-Recordable) and CD-RW (Compact Disk-ReWritable) have used CLV (Constant Linear Velocity) control to write information to the disk, in which the magnetic head moves along a track at a constant linear velocity.

FIG. 1 shows an example of a conventional CD-R disk format. As shown in the drawing, the CD-R disk 1 has a center hole 2 that engages a spindle motor of the CD-R drive. The CD-R disk 1 is rotated by the rotation of the spindle motor. Tracks 3 are formed in the shape of a spiral on the CD-R disk 1. Information is recorded along these tracks 3.

FIG. 2 is an enlarged oblique view of a track portion of a disk. As shown in the drawing, a pre groove 4 is formed along each track 3 on the disk 1 and is defined by curved side walls undulating at a regular interval. The regularly undulating side walls of the pre-groove produce a wobble signal.

ATIP (Absolute Time in Pre-groove) data is modulated on the wobble signal on the wobble signal. The ATIP data is bi-phase modulated as well as frequency modulated before being recorded.

FIGS. 3A, 3B and 3C show ATIP data, wobble signal and a digitized wobble signal, that is, a wobble pulse, respectively.

FM demodulation of the wobble signal shown in FIG. 3B yields the signal shown in FIG. 3A. The signal shown in FIG. 3A is bi-phase modulated ATIP data. The wobble signal shown in FIG. 3B is digitized to yield a wobble pulse like that shown in FIG. 3C.

FIGS. 4A, 4B and 4C illustrate a CLV writing operation. The horizontal axis represents a radial direction of the disk 1, that is, a distance in a direction represented by double-headed arrow A in the drawing. FIG. 4A shows an FG (Frequency Generator) pulse, FIG. 4B shows a wobble pulse and FIG. 4C shows a write clock. The FG pulse is a periodic pulse keyed to the rotation of the spindle motor that rotates the disk 1.

In CLV writing, the rotation of the disk 1 is controlled in such a way that the linear velocity of the tracks 3 is constant for all tracks including the innermost and outermost tracks. As a result, the FG pulse shown in FIG. 4A has a variable cycle.

In addition, because the linear velocity of the tracks 3 is constant for the innermost and outermost tracks, as shown in FIG. 4B the wobble pulse becomes constant.

Further, because the linear velocity of the tracks 3 is constant for the innermost and outermost tracks, as shown in FIG. 4C, the write recording density becomes constant as well.

The conventional CD-R, CD-RW disk device, because it writes data using the CLV system, is required to change the rotation of the disk 1 depending on the position of the light beam or optical head. Moving the light beam from a position on an outer track to a position on an inner track during a seek operation, for example, requires changing the rotational speed of the disk 1 so as to maintain a constant linear velocity. In such a situation it takes time for the rotation of the disk 1 to stabilize, with the result that it takes additional time to write information to the disk.

In addition, in order to change the rotation of the disk 1 the rotation of the spindle motor has to be increased or decreased as necessary. This adjustment of the speed of rotation places an additional load on the spindle motor, both shortening the useful life of the motor as well as increasing the consumption of electrical power.

SUMMARY OF THE INVENTION

Accordingly, it is a general object of the present invention to provide an improved and useful optical disk drive and write speed control method in which the disadvantages described above are eliminated.

Another and more specific object of the present invention is to provide an improved and useful optical disk drive and write speed control method in which a rotational speed of a motor that rotates an optical disk is controlled so as to be constant and a writing frequency at which information is written to the optical disk is controlled in such a way that the information written to the optical disk with a predetermined optimum recording density.

The above-described objects of the present invention are achieved by an optical disk device comprising:
a motor that rotates an optical disk;
motor control means for making constant a rotational speed of the motor; and
write control means for changing a write frequency of information written to the optical disk such that writing of the information onto the optical disk is made at a substantially constant recording density, irrespective of a track on which the information is recorded.

Additionally, the above-described objects of the present invention are also achieved by the optical disk device as described above, further comprising:
wobble signal detecting means for detecting a wobble signal recorded along a track formed on the optical disk;
sync signal detecting means for detecting a first sync signal recorded at a constant interval on the track formed on the optical disk;
write clock generating means for generating a write clock according to an optical head position on the optical disk, the write clock generating means generating the write clock from the wobble signal detected by the wobble signal detecting means;
second sync signal generating means for generating a second sync signal according to the write clock generated by the write clock generating means:
phase difference detecting means for detecting a phase difference between the first sync signal and the second sync signal; and
write clock control means for controlling the write clock generated by the write clock generating means according to the phase difference detected by the phase difference detecting means.

Additionally, the above-described objects of the present invention are also achieved by the optical disk device as described above, further comprising synchronization detecting means for detecting a synchronization of the first sync signal and the second sync signal, wherein the write control means writes information to the optical disk after synchronization has been detected by the synchronization detecting means.

Additionally, the above-described objects of the present invention are also achieved by an optical disk write control method for controlling the speed at which information is written to tracks formed on an optical disk by an optical disk device, comprising the steps of:

rotating the optical disk at a constant angular velocity; and changing the information recording frequency between outer tracks and inner tracks of the optical disk so as to achieve a constant linear recording density.

Additionally, the above-described objects of the present invention are also achieved by the optical disk write control method as described above, further comprising the steps of:

detecting a wobble signal recorded along a track formed on the optical disk;

generating a write clock according to an optical head position on the optical disk from the wobble signal detected at the wobble signal detecting step;

generating a second sync signal according to the write clock generated at the write clock generating step;

detecting a first sync signal recorded at a constant interval on the track formed on the optical disk;

detecting a phase difference between a first sync signal and a second sync signal; and controlling the write clock generated at the write clock generating step according to the phase difference detected at the phase difference detecting step.

Additionally, the above-described objects of the present invention are also achieved by the optical disk write control method as described above, further comprising the steps of:

detecting a synchronization of the first sync signal and the second sync signal; and commencing writing information to the optical disk after synchronization has been detected at the synchronization detecting step.

According to the invention described above, there is no need to change the speed of rotation of the disk in response to the position of the optical head. As a result, the time needed to write information to the optical disk can be shortened.

In addition, the spindle motor does not accelerate rapidly, so power consumption can be reduced and the useful life of the motor prolonged.

Further, the write frequency decreases toward the inner side of the disk and increases toward the outer side of the disk. Accordingly, by setting the write frequency at the inner side to a normal write frequency the write frequency at the outer side can be increased, thereby increasing the overall speed of data transfer.

Other objects, features and advantages of the present invention will become more apparent from the following detailed description when read in conjunction with the accompanying drawings.

BRIEF DESCRIPTION OF THE DRAWINGS

FIGS. 3A, 3B and 3C show ATIP data, wobble signal and a digitized wobble signal, respectively;

FIGS. 13A, 13B and 13C are diagrams for explaining the operation of one embodiment of the present invention.

DESCRIPTION OF THE PREFERRED EMBODIMENTS

A description will now be given of an optical disk drive and write speed control method according to one embodiment of the present invention:, with reference to the accompanying drawings.

Figure 1:
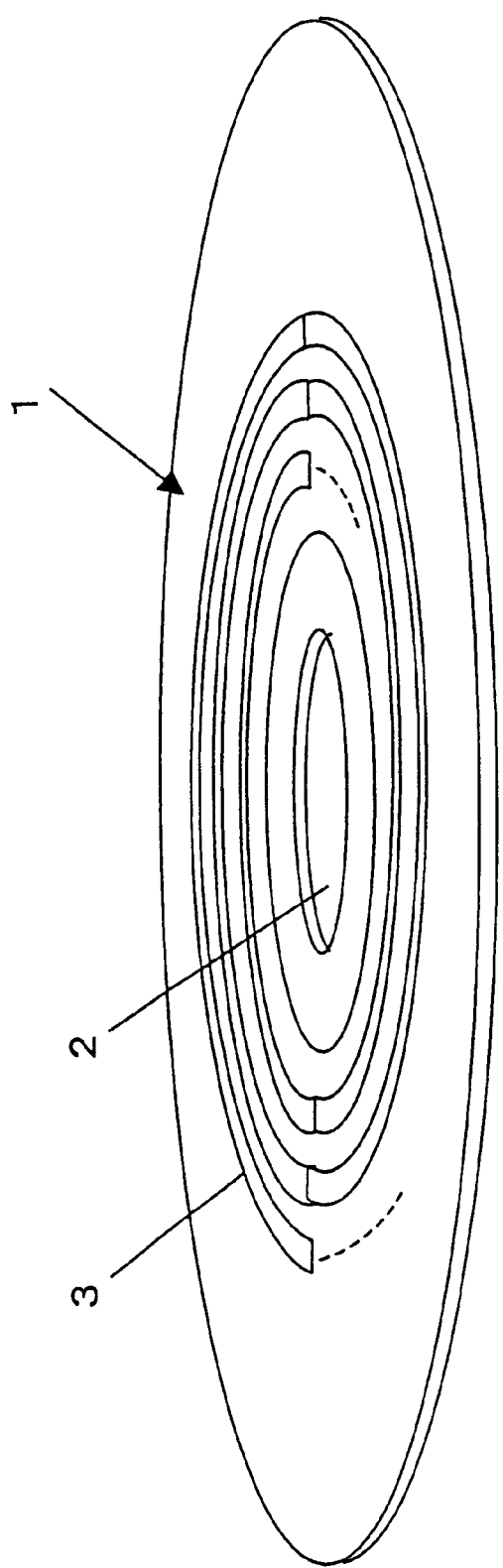
FIG. 1 shows an example of a conventional CD-R disk format.
Figure 2:
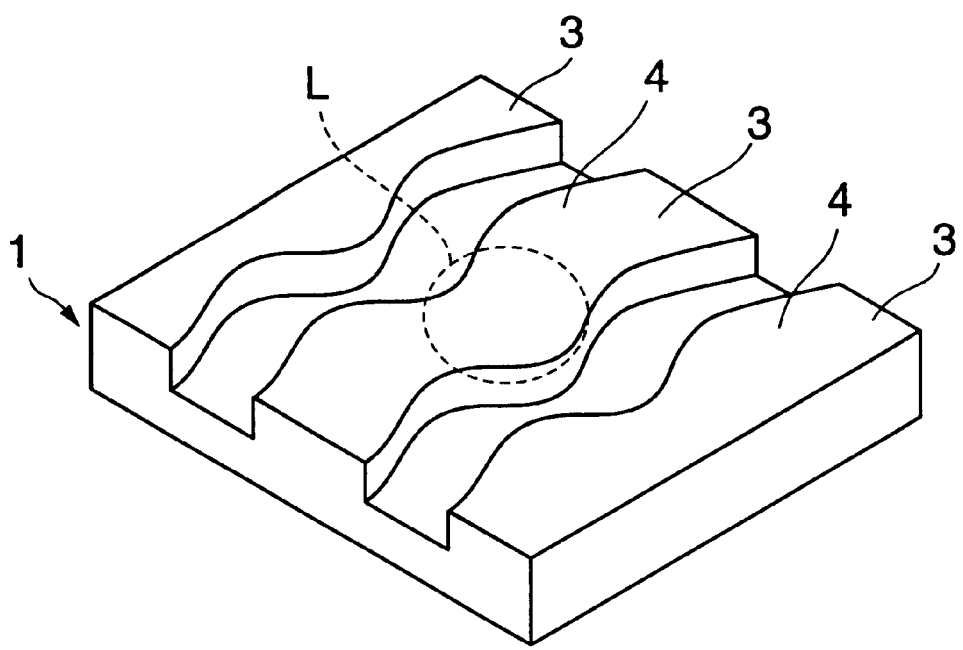
FIG. 2 is an enlarged oblique view of a track portion of a disk.
Figure 4A:
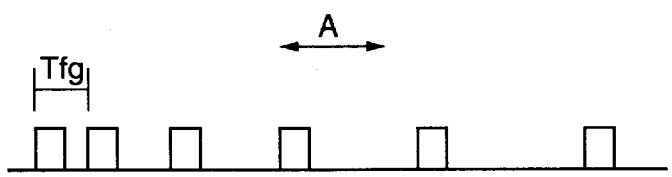
FIGS. 4A, 4B and 4C illustrate a CLV writing operation.
Figure 4B:
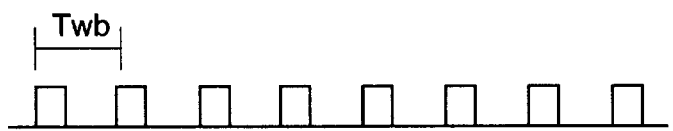
Figure 4C:
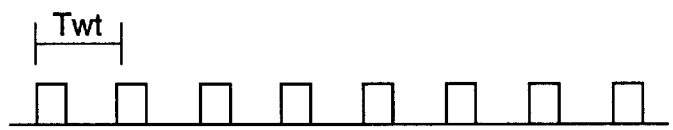
Figure 5:
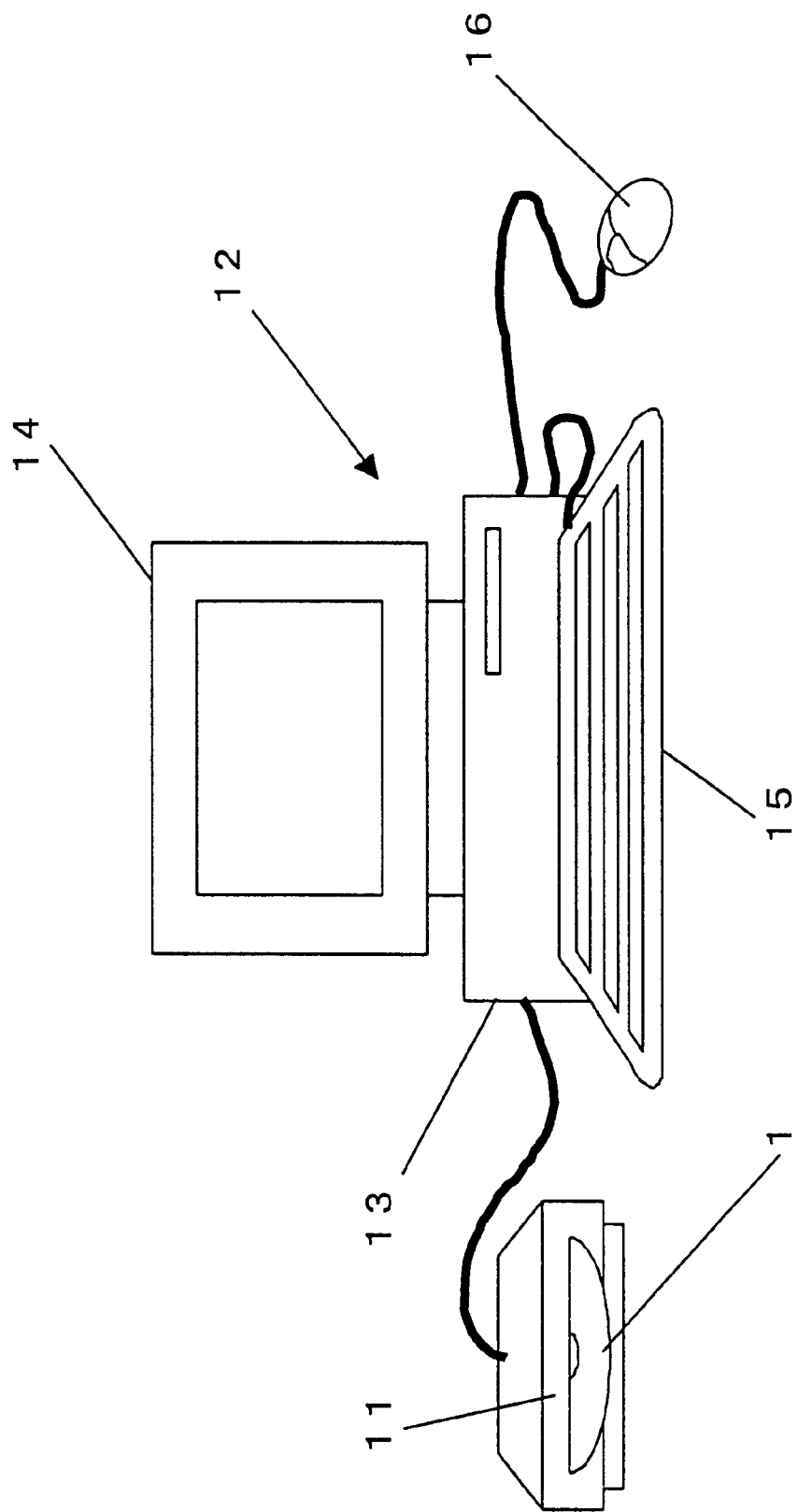
FIG. 5 is a schematic diagram of one embodiment of the present invention.

FIG. 5 is a schematic diagram of one embodiment of the present invention. The optical disk drive 11 of the present embodiment is a CD-R drive, forms part of a computer system 12 and writes information to and reads information from a CD-R disk 1.

The computer system 12 comprises a main unit 13, a display 14, a keyboard 15 and a mouse 16. The optical disk drive 11 is connected to the main unit 13 using an interface such as a SCSI (Small Computer System Interface). The optical disk drive 11 can also be built into the main unit 13 and connected via an interface such as a SCSI or IDE (Integrated Drive Electronics).

The optical disk drive 11 writes data processed by the main unit 13 to the disk 1 and at the same time supplies data written to the disk 1 to the main unit 13.

Next, a description will be given of the optical disk drive 11.

Figure 6:
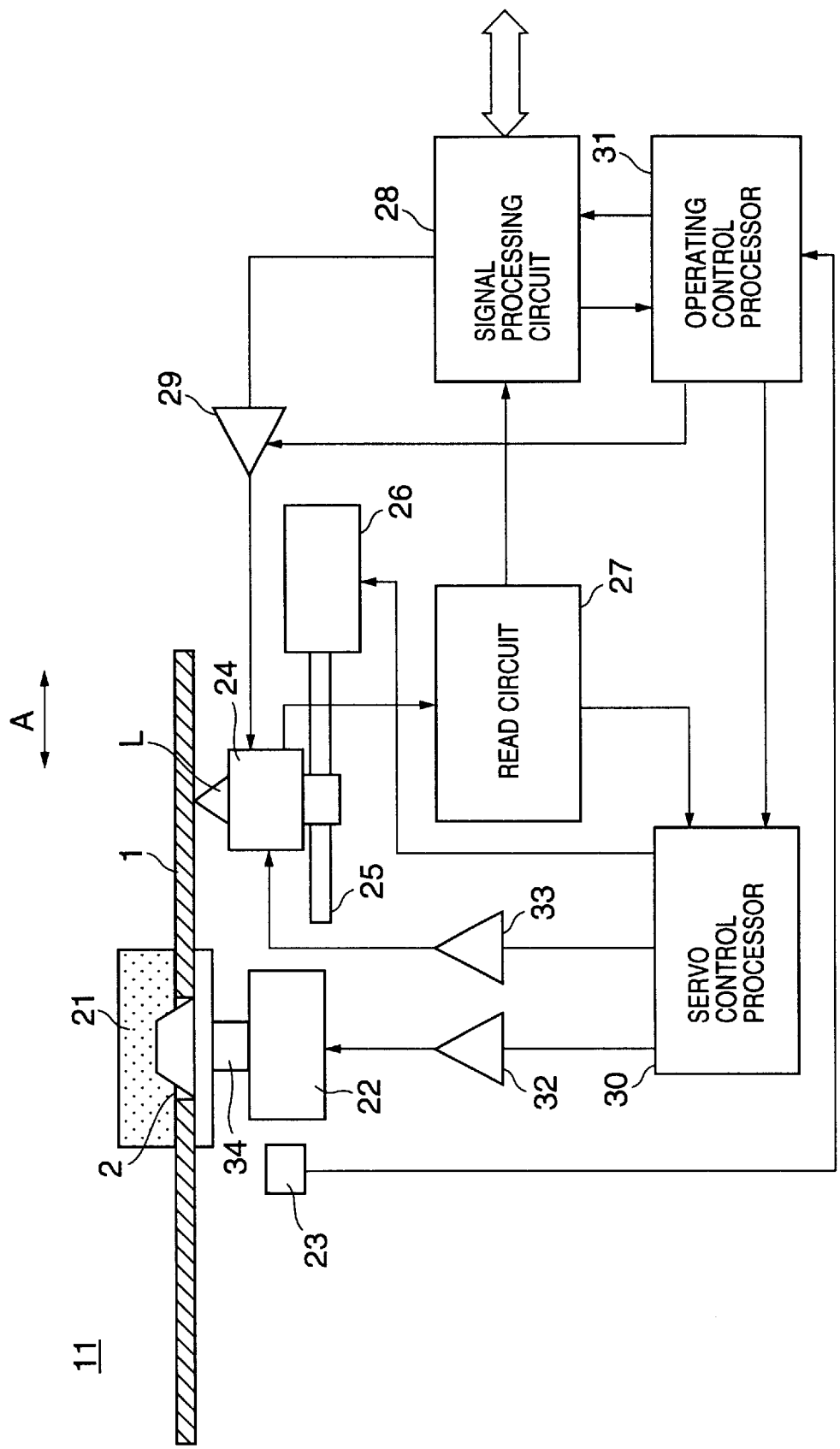
FIG. 6 is a block diagram of one embodiment of the present invention.

FIG. 6 is a block diagram of the optical disk drive 11 according to one embodiment of the present invention. The optical disk drive 11 comprises a disk damper 21, spindle motor 22, FG (Frequency Generator) sensor 23, pick-up 24, thread mechanism 25, thread motor 26, read circuit 27, signal processing circuit 28, write circuit 29, servo control mechanism 30, operation control processor 31 and drivers 32, 33.

The disk damper 21 engages the center hole 2 of the disk 1 and clamps the disk 1 at a predetermined position. The disk damper 21 is connected to a rotary shaft 34 of the spindle motor 22. The spindle motor 22 rotates the rotary shaft 34, thus rotating the disk damper 21. By rotating the disk damper 21 the disk 1 is also rotated.

The FG sensor 23 outputs a detection signal in response to the rotation of the spindle motor 22. The detection signal output by the FG sensor 23 is supplied to the operation control processor 31. The operation control processor 31 detects the rotation of the spindle motor 22 from the detection signal from the FG sensor and supplies that detection result to the spindle servo control processor 30. The spindle servo control processor 30 controls the spindle motor according to the detection result from the operation control processor 31.

The pick-up 24 is positioned opposite the disk 1 and directs a laser beam L onto the disk 1. Information is written to or read from the disk 1 according to the laser beam L directed onto the disk 1 by the pick-up 24. The pick-up 24 is engaged by the thread mechanism 25. The thread mechanism 25 is driven by the thread motor 26 and moves the pick-up in a direction represented by arrow A in the diagram. It should be noted that the direction represented by arrow A is a radial direction of the disk 1.

A description will now be given of the pick-up 24.

Figure 7:
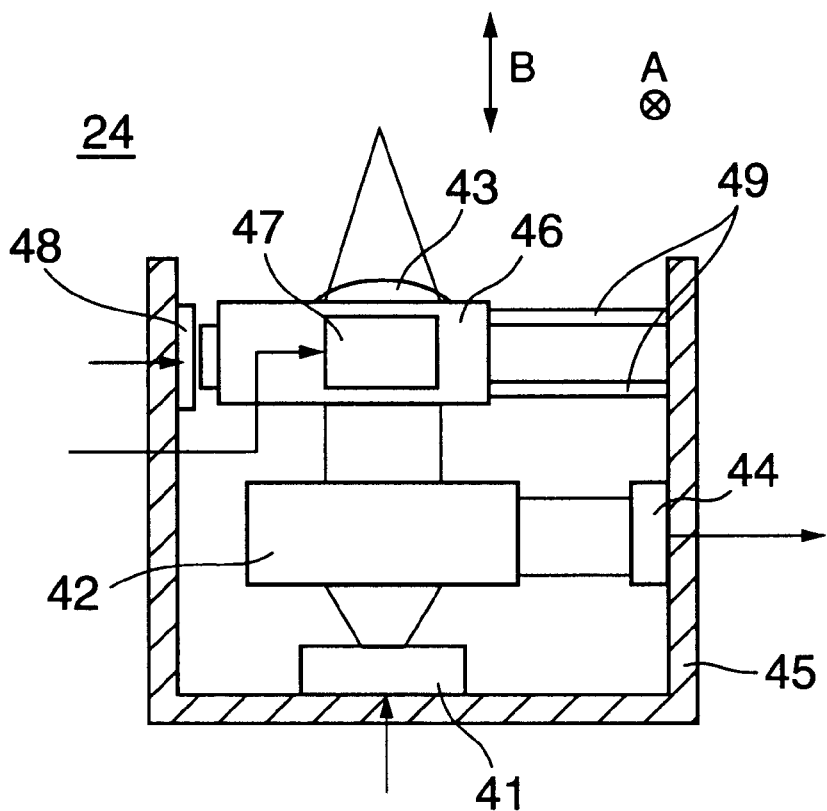
FIG. 7 shows a structure of a pick-up according to one embodiment of the present invention.

FIG. 7 shows a structure of the pick-up 24 according to one embodiment of the present invention. As shown in the drawing, the pick-up 24, laser diode 41, optical system 42, object lens 43, optical detector 44, carriage 45, lens holder 46, tracking actuator 47, focus actuator 48 and support spring 49.

The laser diode 41 is supported by the carriage 45 and generates a laser beam in response to a signal from the write circuit 29. The laser beam generated by the laser diode 41 is supplied to the optical system.

The optical system 42 converts the laser beam from the laser diode 41 into parallel rays and supplies them to the object lens 43. The object lens 43 then concentrates the parallel rays onto the disk 1. The parallel rays directed onto the disk 1 are then reflected by the disk 1, passed once more through the object lens 43 and supplied to the optical system 42. The optical system 42 supplies the light reflected from the disk 1 to the optical detector 44. The optical detector 44 converts the light reflected from the disk 1 into an electrical signal and outputs a focus error signal and a tracking error signal as well as a read signal.

The object lens 43 is supported by a lens holder 46. The lens holder 46 is supported by the carriage 45 via the supporting spring 49. The lens holder 46 is oscillated by the tracking actuator 47 in a direction indicated by double-headed arrow A in FIG. 6 and oscillated by the focus actuator 48 in a direction indicated by double-headed arrow B in FIG. 7. The tracking actuator 47 is driven by a tracking error signal from the servo control processor 30. Additionally, the focus actuator 48 is driven by a focus error signal from the servo control processor 30.

The output signal from the optical detector 44 is supplied to the read circuit 27. The read circuit 27 demodulates the tracking error signal, focus error signal and read signal from the optical detector 44. The demodulated signal is supplied to the servo control processor 30 and the signal processing circuit 28.

The servo control processor 30 controls the spindle motor 22 so that the spindle motor 22 rotates at a constant rotation in response to rotation information from the operation control processor 31. Additionally, the servo control processor 30 controls the pick-up 24 in response to a tracking error signal and focus error signal from the read circuit 27 so as to control the tracking as well as the focus. Further, the servo control processor 30 controls the thread motor 26 so as to control the positioning of the pick-up 24 in the direction of arrow A.

The driver 32 drives the spindle motor 22 in response to drive information from the servo control processor 30. The driver 33 drives both the tracking actuator 47 in response to a tracking error signal from the servo control processor 30 as well as the focus actuator 48 in response to a focus error signal from the servo control processor 30.

Additionally, the signal processing circuit 28 both decodes information from the read signal from the read circuit 27 and encodes information which the signal processing circuit 28 then supplies as a write signal to the pick-up 24. Further, the signal processing circuit 28 is connected to the computer main unit 13 via an interface such as an IDE, SCSI or ATAPI (AT Attachment Packet Interface).

Next, a description will be given of the signal processing circuit 28.

Figure 8:
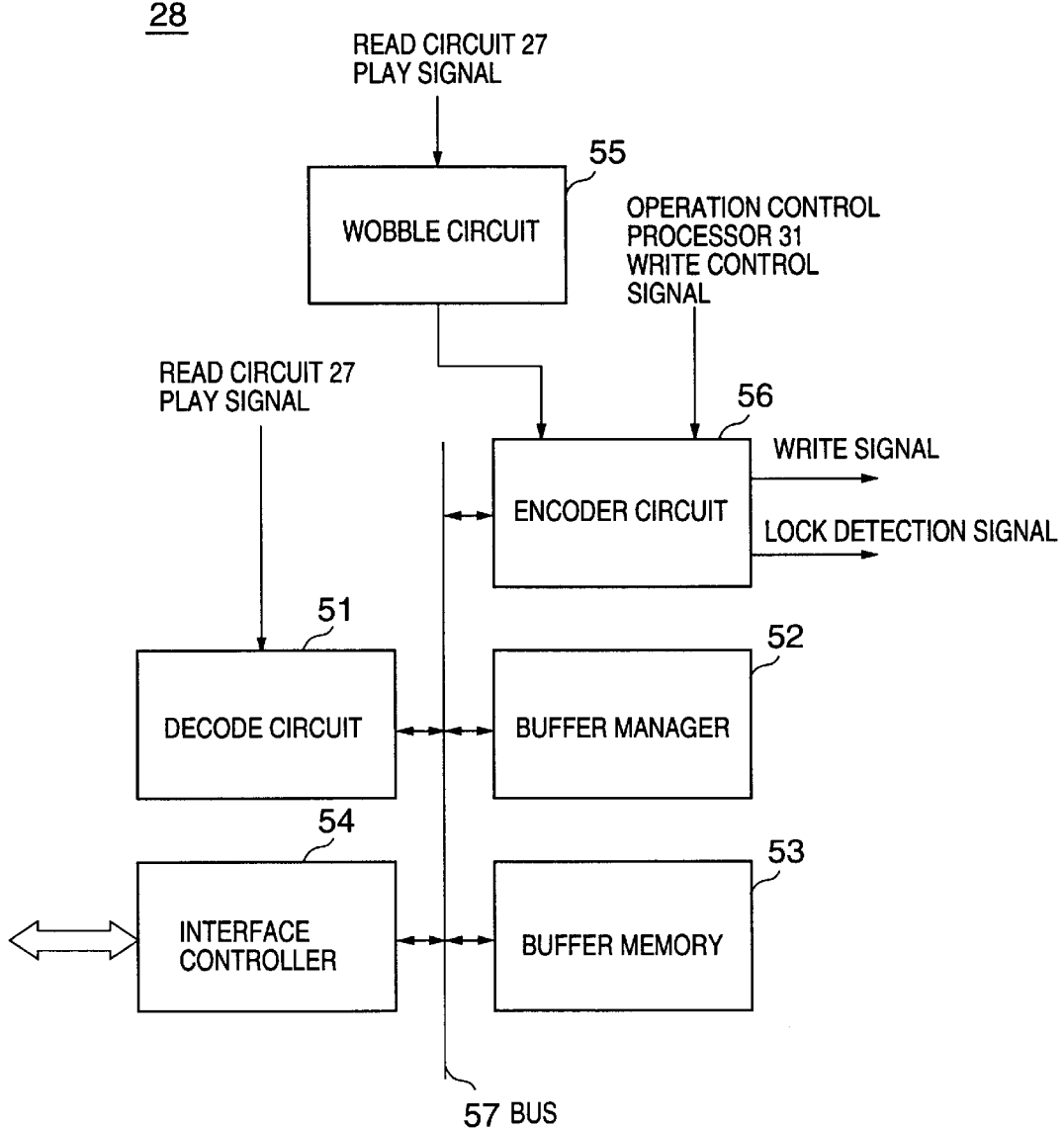
FIG. 8 is a block diagram of a signal processing circuit according to one embodiment of the present invention.

FIG. 8 is a block diagram of the signal processing circuit 28 according to one embodiment of the present invention. The signal processing circuit 28 comprises a decoder circuit 51, :buffer manager 52, buffer memory 53, interface controller 54, wobble circuit 55, encoder circuit 56 and a bus 57.

A read signal is supplied to the decoder circuit 51 from the read circuit 27. The decoder circuit 51 decodes the read signal from the read circuit 27 and obtains read data. The read data decoded by the decoder circuit 51 is stored in the buffer memory 53. The read data stored in the buffer memory 53 is transferred to the main unit 13 via the interface controller 54.

Additionally, write data supplied from the computer main unit 13 is stored in the buffer memory 53 via the interface controller 54. The write data stored in the buffer memory 53 is supplied to the encoder circuit 56. The encoder circuit 56 encodes the write data to the write signal and supplies it to the write signal circuit 29.

The wobble circuit 55 extracts a wobble pulse and a first sync signal from a wobble signal from the read circuit 27. The encoder circuit 56 sets the write signal frequency in response to the first sync signal from the wobble circuit 55.

Figure 9:
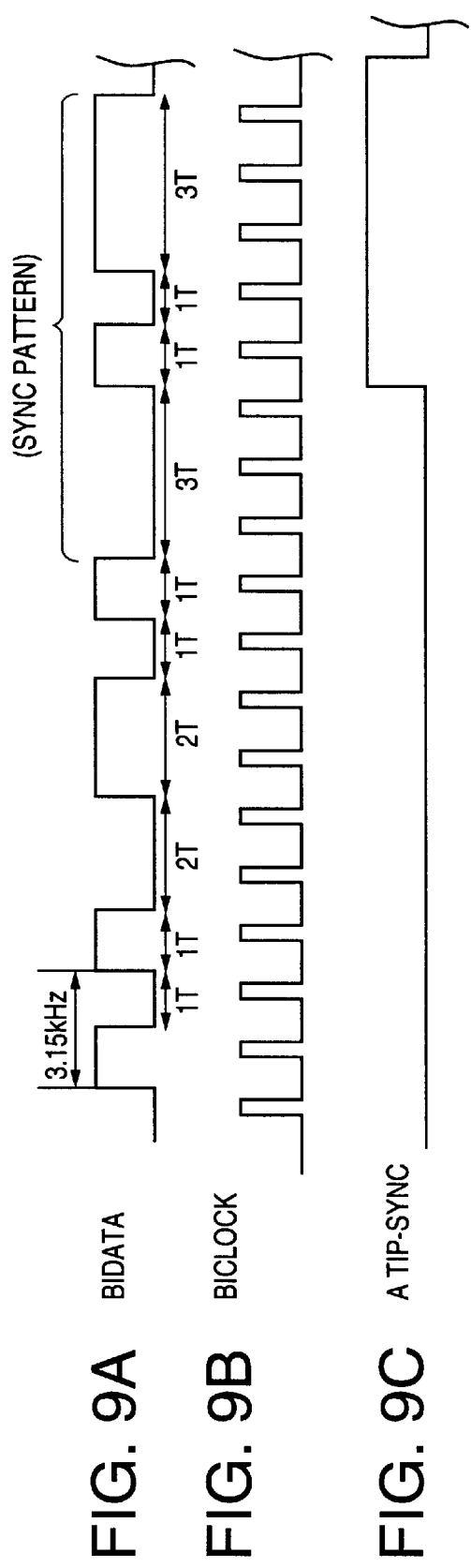
FIGS. 9A, 9B and 9C are diagrams for explaining an operation of a wobble circuit according to one embodiment of the present invention.

FIGS. 9A, 9B and 9C are diagrams for explaining the operation of the wobble circuit according to one embodiment of the present invention. FIG. 9A shows a TIP data pattern, FIG. 9B shows a biclock signal and FIG. 9C shows the first sync signal pattern.

The wobble circuit 55 demodulates the ATIP data pattern shown in FIG. 9A by biphase demodulating the signal shown in FIG. 3A. Additionally, the wobble circuit 55 extracts the biclock shown in FIG. 9B from the wobble signal.

The wobble circuit 55 checks the ATIP data pattern shown in FIG. 9A against the clock shown in FIG. 9B and searches for a sync pattern. As shown in FIG. 9A, the sync pattern is a pattern consisting of a low output of three cycles followed by a high output of one cycle, a low output of one cycle and a high output of three cycles.

It should be noted that the first sync signal is output at the recording density shown in FIG. 9C in response to the sync pattern shown in FIG. 9A.

Next, a description will be given of the encoder circuit 56.

Figure 10:
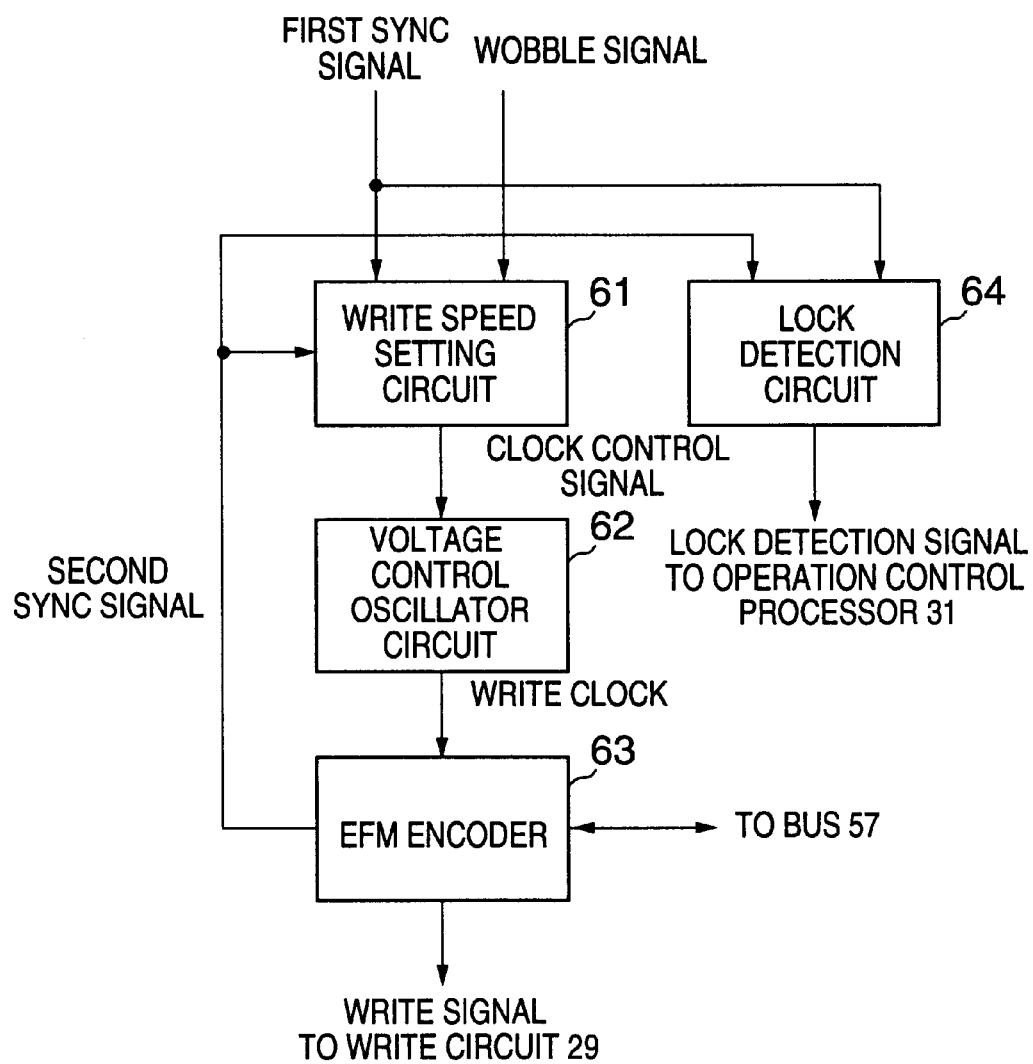
FIG. 10 is a block diagram of an encoder circuit according to one embodiment of the present invention.

FIG. 10 is a block diagram of the encoder circuit 56 according to one embodiment of the present invention. As shown in the diagram, the encoder circuit 56 comprises a write speed setting circuit 61, a voltage control oscillator circuit 62, an EFM (Eight Fourteen Modulation) encoder 63 and a lock detection circuit 64.

The write speed setting circuit 61 is supplied with a wobble signal and a first sync signal from the wobble circuit 55 and at the same time is supplied with a second sync signal from the EFM encoder 63. The write speed setting circuit 61 generates a write clock control signal from the first and second sync signal as well as the wobble signal.

The write clock control signal is supplied to the voltage control oscillator circuit 62. The voltage control oscillator circuit 62 outputs an oscillation signal of a frequency corresponding to the write clock control signal. The oscillation signal of the voltage control oscillator circuit 62 is supplied to the EFM encoder 63.

The EFM encoder 63 is supplied with write data from the bus 57 and at the same time is supplied with a write clock from the voltage control oscillator circuit 62. The EFM encoder 63 encodes write data at a frequency corresponding to the write clock.

The lock detection circuit 64 compares the first and second sync signals, detects when the first and second sync signals are synchronized and outputs a lock detection signal.

A description will now be given of the write speed setting circuit 61.

Figure 11:
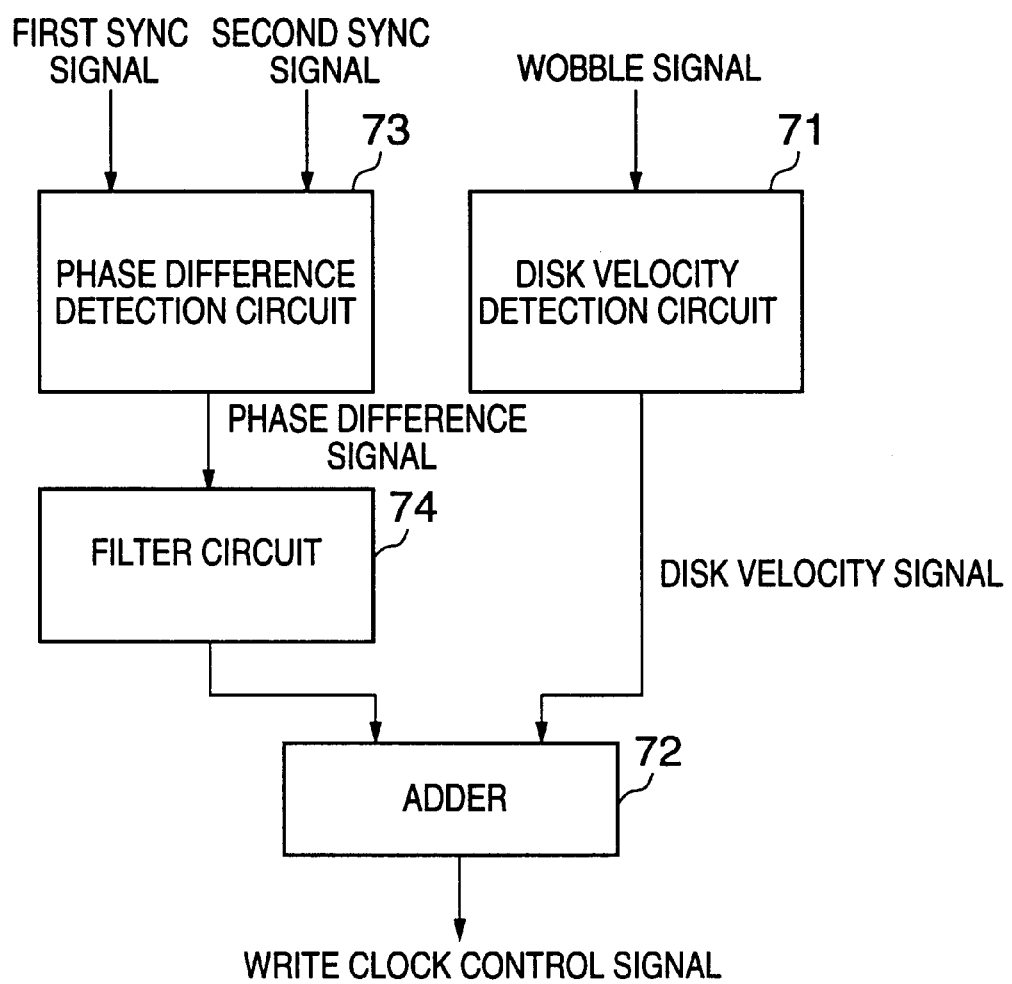
FIG. 11 is a block diagram of a write speed setting circuit according to one embodiment of the present invention.

FIG. 11 is a block diagram of the write speed setting circuit 61 according to o,one embodiment of the present invention. The write speed setting circuit 61 comprises a linear velocity detection circuit 71, an adder 72, a phase difference detection circuit 73 and a filter 74.

The linear velocity detection circuit 71 is supplied with a wobble pulse from the wobble circuit 55. The linear velocity detection circuit 71 measures the cycle of the wobble pulse and detects the velocity of the disk from the cycle of the wobble pulse.

The wobble pulse is formed so as to appear at a constant interval on the track 3. As a result, when the disk 1 rotates at a constant velocity the linear velocity of the tracks 3 on the inner side of the disk 1 is greater than the linear velocity of the tracks 3 on the outer side of the disk 1, so the cycle of the wobble pulse at the outer side of the disk 1 is shorter than the cycle of the wobble pulse at the inner side of the disk. Accordingly, by detecting the cycle of the wobble pulse it is possible to detect the linear velocity of the track 3. The detection result of the linear velocity detection circuit 71 is supplied to the adder 72.

The phase difference detection circuit 73 is supplied with the first sync signal and the second sync signal. The phase difference detection circuit 73 outputs a phase difference signal corresponding to the phase difference between the first sync signal and the second sync signal. The phase difference signal supplied from the phase difference detection circuit 73 is supplied to the filter 74.

The filter 74 removes the noise component from the phase difference signal from the phase difference detection circuit 73. The phase difference signal from which the noise component has been removed by the filter 74 is supplied to the adder 72.

The adder 72 adds the linear velocity signal from the linear velocity detection circuit 71 and the phase difference signal from the filter 74 and outputs the sum as a write clock control signal.

A description will now be given of an operation of the operation control processor 31.

Figure 12:
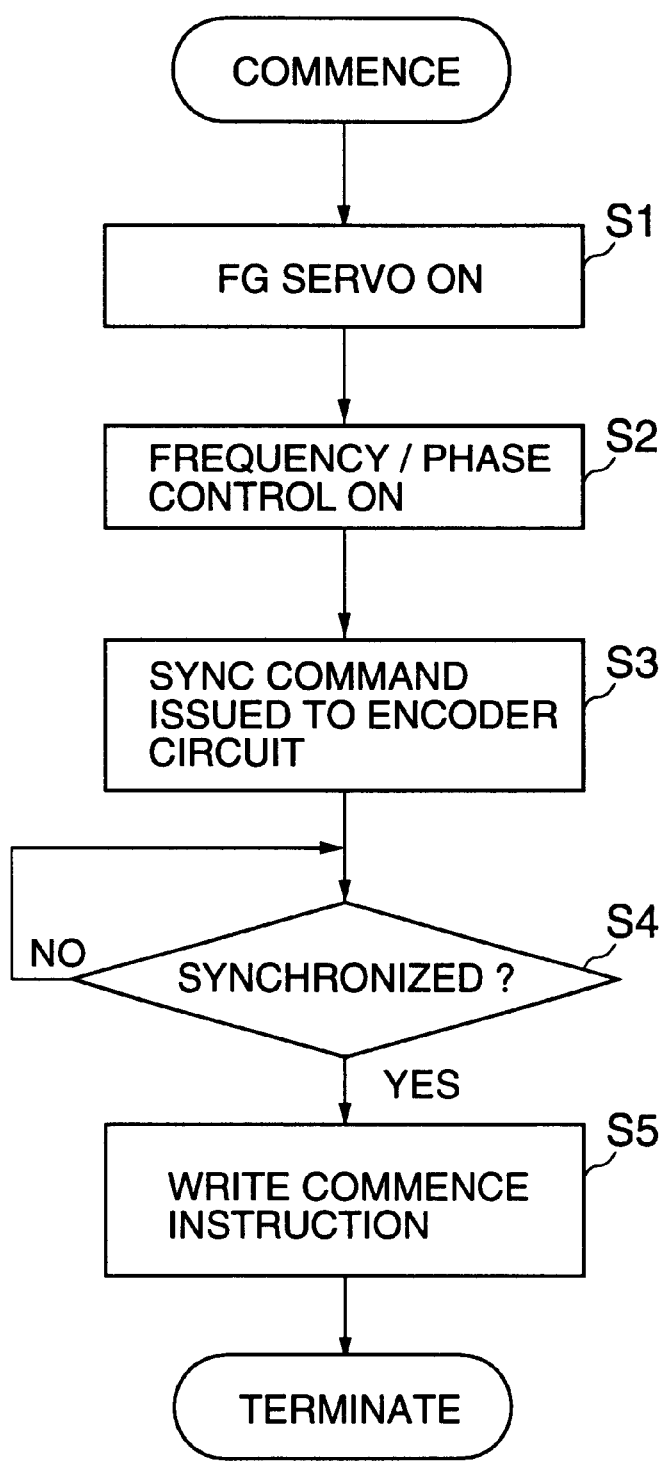
FIG. 12 is a flowchart of steps in an operation of a control processor when writing information to a disk, according to one embodiment of the present invention.

FIG. 12 is a flowchart of steps in the operation of the control processor 31 when:writing information to the disk 1, according to one embodiment of the present invention.

The operation control processor 31 write process comprises steps S1, S2, S3, S4 and S5. In step S1, the operation control processor 31 supplies the detection signal from the FG sensor 21 to the servo control processor 30 and also turns the servo control processor 30 FG servo ON. When the FG servo is turned ON the servo control processor 30 adjusts the rotational speed of the spindle motor 22 to a constant speed of rotation so that the FG sensor 21 detection signal supplied from the operation control processor 31 achieves a predetermined frequency.

In step S2 the tracking control is turned ON, with the operation control processor 31 instructing the servo control processor 30 to carry out tracking control. Specifically, the servo control processor 30 controls the thread motor 26, the tracking actuator 47 and the focus actuator 48 in response to a read signal from the read circuit 27 so as to perform tracking control and focus control so that the laser beam L follows the track 3 on the disk 1.

In step S3, a synchronization command is output to the encoder circuit 56, with the operation control processor 31 instructing the signal processing circuit 28 to synchronize the first and second sync signals.

First, the write speed setting circuit 61 generates a clock control signal from the wobble pulse of the wobble circuit 55. The voltage control oscillator circuit 62 then generates a write clock of a frequency corresponding to the clock control signal generated by the write speed setting circuit 61. The write clock generated by the voltage control oscillator circuit 62 is supplied to the EFM encoder 63. The EFM encoder 63 generates a second sync signal from the write clock. The second sync signal generated by the EFM encoder 63 is then supplied to the write speed setting circuit 61.

At this stage, the write speed setting circuit 61 is supplied with both the first sync signal and the second sync signal. The write speed setting circuit 61 then detects a phase difference between the first sync signal and the second sync signal and supplies the signal added to the linear velocity obtained from the wobble pulse from the wobble pulse circuit 55 as a clock control signal to the voltage control oscillator circuit 62.

The voltage control oscillator circuit 62 adjusts the frequency of the write clock according to the phase difference between the first sync signal and the second sync signal. The EFM encoder 63 generates the second sync signal according to the write clock supplied from the voltage control oscillator circuit 62.

By repeating the operations described above the first sync signal and the second sync signal are synchronized.

In step S4 it is determined whether or not the first sync signal and the second sync signal have been synchronized. The lock detection: circuit 64 is supplied with both the first sync signal and the second sync signal. When the first and second sync signals are synchronized the lock detection circuit 64 outputs a lock detection signal.

The first sync signal and the second sync signal are determined to be synchronized when the phase difference between them falls below a predetermined value, at which point a lock detection signal is generated from the lock detection circuit 64. The operation control processor 31 determines that the first and second sync signals are synchronized by the presence of the lock detection signal. Step S5 is then executed once it is determined in step S4 that the first sync signal and the second sync signal are synchronized.

In step S5 an instruction to begin writing is issued. When the operation control processor 31 is supplied with a lock detection signal from the signal processing circuit 28 a write commence instruction is supplied to the signal processing circuit 28 and the write circuit 29. The signal processing circuit 28 then encodes write data according to the write commence instruction and generates a write signal. Additionally, the write circuit 29 drives the laser diode 41 according to the write signal supplied from the signal processing circuit 28.

Data is thus written to the disk 1 in the manner described above.

FIGS. 13A, 13B and 13C are diagrams for explaining the operation of the present embodiment. FIG. 13A shows the FG pulse, FIG. 13B shows the wobble pulse and FIG. 13C shows the write recording density.

In the drawing, the horizontal axis represents the radial direction of the disk 1 and corresponds to the direction of arrow A described previously. According to the present embodiment the spindle motor 22 is rotated at a constant speed, so the FG pulse has a constant cycle Tgf as shown in FIG. 13A.

Additionally, the wobble pulse is formed at a constant linear velocity along the track 3, so the cycle of the wobble pulse lengthens near the center and shortens near the periphery as shown in FIG. 13B.

Further, the write clock is generated according to the cycle of the wobble pulse shown in FIG. 13B, so like the wobble pulse the cycle of the write close also lengthens near the center and shortens near the periphery as shown in FIG. 13C.

Accordingly, with the present embodiment the disk is rotated at a constant speed, so the load on the spindle motor can be reduced. Accordingly, power consumption can be reduced and the useful life of the spindle motor can be prolonged.

Moreover, data can be stored using the same format as the conventional CLV type disk, so information written to a disk using the disk drive of the present embodiment can be read by a conventional CLV disk drive.

Additionally, data transfer speed can be increased because the write recording density is adjusted while the disk is rotated at a constant maximum speed, so there is no need to wait for the disk rotation to stabilize.

It should be noted that although the present embodiment has been described with reference to a CD-R drive the present invention is not limited to such a drive but can, for example, be adapted for use with a CD-RW drive as well.

The above description is provided in order to enable any person skilled in the art to make and use the invention and sets forth the best mode contemplated by the inventors of carrying out the invention.

The present invention is not limited to the specifically disclosed embodiments and variations, and modifications may be made without departing from the scope and spirit of the present invention.

What is claimed is:

1. An optical disk device comprising:
    a motor that rotates an optical disk;
    motor control means for making constant a rotational speed of the motor;
    write control means for changing a write frequency of information written to the optical disk such that writing of the information onto the optical disk is made at a substantially constant recording density, irrespective of a track on which the information is recorded;
    wobble signal detecting means for detecting a wobble signal recorded at a constant frequency along a track formed on the optical disk;
    sync signal detecting means for detecting a first sync signal recorded at a constant interval on the track formed on the optical disk;
    write clock generating means for generating a write clock according to an optical head position on the optical disk, the write clock generating means generating the write clock from the wobble signal detected by the wobble signal detecting means;
    second sync signal generating means for generating a second sync signal according to the write clock generated by the write clock generating means;
    phase difference detecting means for detecting a phase difference between the first sync signal and the second sync signal; and
    write clock control means for controlling the write clock generated by the write clock generating means according to the phase difference detected by the phase difference detecting means.

2. An optical disk write control method for controlling the speed at which information is written to tracks formed on an optical disk by an optical disk device, the method comprising the steps of:
    rotating the optical disk at a constant angular velocity;
    changing the information recording frequency between outer tracks and inner tracks of the optical disk so as to achieve a constant linear recording density;
    detecting a wobble signal recorded along a track formed on the optical disk;
    generating a write clock according to an optical head position on the optical disk from the wobble signal detected at the wobble signal detecting step;
    generating a second sync signal according to the write clock generate at the write clock generating step;
    detecting a first sync signal recorded at a constant interval on the track formed on the optical disk;
    detecting a phase difference between a first sync signal and a second sync signal; and
    controlling the write clock generated at the write clock generating step according to the phase difference detected at the phase difference detecting step.

* * * * *